United States Patent
Petitpas et al.

(10) Patent No.: US 11,965,624 B2
(45) Date of Patent: Apr. 23, 2024

(54) COMPRESSION APPARATUS AND FILLING STATION COMPRISING SUCH AN APPARATUS

(71) Applicant: L'Air Liquide, Societe Anonyme pour l'Etude et l'Exploitation des Procedes Georges Claude, Paris (FR)

(72) Inventors: Guillaume Petitpas, Jouy-en-Josas (FR); Cyril Benistand-Hector, Sassenage (FR)

(73) Assignee: L'Air Liquide, Societe Anonyme Pour l'Etude Et l'Exploitation des Procedes Georges Claude, Paris (FR)

( * ) Notice: Subject to any disclaimer, the term of this patent is extended or adjusted under 35 U.S.C. 154(b) by 339 days.

(21) Appl. No.: 17/238,633

(22) Filed: Apr. 23, 2021

(65) Prior Publication Data
US 2021/0332950 A1   Oct. 28, 2021

(30) Foreign Application Priority Data
Apr. 23, 2020 (FR) .................. FR 2004039

(51) Int. Cl.
*F17C 5/04* (2006.01)
*B67D 7/36* (2010.01)
(Continued)

(52) U.S. Cl.
CPC .............. *F17C 5/04* (2013.01); *B67D 7/36* (2013.01); *B67D 7/54* (2013.01); *B67D 7/78* (2013.01);
(Continued)

(58) Field of Classification Search
CPC .... F04B 39/022; F04B 39/0276; F04B 37/08; F17C 5/04; F17C 2221/012;
(Continued)

(56) References Cited

U.S. PATENT DOCUMENTS 2,730,957 A   1/1956  Riede
3,070,022 A   12/1962  McCormack
(Continued)

FOREIGN PATENT DOCUMENTS

EP  3 409 998  12/2018
FR  2 961 560  6/2012

OTHER PUBLICATIONS

French Search Report and Written Opinion for FR 2 004 039, dated Oct. 2, 2020.

*Primary Examiner* — Timothy P. Kelly
*Assistant Examiner* — Christopher M Afful
(74) *Attorney, Agent, or Firm* — Elwood L. Haynes (57) ABSTRACT

Apparatus for compressing cryogenic fluid in at least one compression stage comprising at least one piston and at least one sleeve delimiting at least one compression chamber, a shaft that is able to move in translation along a longitudinal axis (A), the shaft being connected to the piston(s) or sleeve(s) and being able to move with an alternating movement in two opposite directions to ensure phases of compression and intake of fluid into the at least one compression chamber by moving the at least one piston and the at least one sleeve in a relative manner, characterized in that the shaft comprises a portion of reduced cross section in the longitudinal direction (A), said portion of reduced cross section separating two adjacent parts of the shaft, the shaft also comprising at least one linking element made of material that is less thermally conductive than the constituent material of the shaft, in particular a composite material, said at least one linking element having two ends connected respectively to the two adjacent parts of the shaft.

14 Claims, 5 Drawing Sheets

(51) Int. Cl.
*B67D 7/54* (2010.01)
*B67D 7/78* (2010.01)
*F04B 37/08* (2006.01)
*F04B 39/02* (2006.01)

(52) U.S. Cl.
CPC .......... *F04B 37/08* (2013.01); *F04B 39/0276* (2013.01); *F17C 2221/012* (2013.01); *F17C 2223/0161* (2013.01); *F17C 2227/0164* (2013.01); *F17C 2227/0337* (2013.01); *F17C 2265/063* (2013.01)

(58) Field of Classification Search
CPC ...... F17C 2223/0161; F17C 2227/0164; F17C 2227/0337; F17C 2265/063; B67D 7/36; B67D 7/54; B67D 7/78
USPC .......................................................... 141/46
See application file for complete search history.

(56) References Cited

U.S. PATENT DOCUMENTS

| | | | |
|---|---|---|---|
| 4,156,584 A | | 5/1979 | Schuck |
| 5,520,002 A | * | 5/1996 | Ishikawa ................. H01J 37/18 |
| | | | 62/55.5 |
| 8,141,581 B2 | * | 3/2012 | Boyd, Jr. ............... F04B 39/121 |
| | | | 417/469 |
| 2007/0065321 A1 | * | 3/2007 | Durham .............. F04B 53/1032 |
| | | | 417/559 |
| 2018/0347761 A1 | | 12/2018 | Lacombe et al. |
| 2019/0293067 A1 | | 9/2019 | Bonvilain |

\* cited by examiner

COMPRESSION APPARATUS AND FILLING STATION COMPRISING SUCH AN APPARATUS

CROSS-REFERENCE TO RELATED APPLICATIONS

This application claims the benefit of priority under 35 U.S.C. § 119 (a) and (b) to French patent application No. FR 2 004 039, filed Apr. 23, 2020, the entire contents of which are incorporated herein by reference.

BACKGROUND

Field of the Invention

The invention relates to a compression apparatus, in particular for cryogenic fluid, and to a filling station comprising such an apparatus. The invention relates in particular to an apparatus for compressing or pumping cryogenic gases and/or liquids.

The invention relates more particularly to an apparatus for compressing cryogenic fluid in at least one compression stage comprising at least one piston and at least one sleeve delimiting at least one compression chamber, a shaft that is able to move in translation along a longitudinal axis, the shaft being connected to the piston(s) or sleeve(s) and being able to move with an alternating movement in two opposite directions to ensure phases of compression and intake of fluid into the at least one compression chamber by moving the at least one piston and the at least one sleeve in a relative manner.

In the description of the invention, the terms "compression apparatus" and "pump" may be used interchangeably, as may the terms "pumping" and "compression". Specifically, the apparatus that is the subject of the invention is an apparatus for pumping and/or compressing liquid and/or gaseous and/or supercritical cryogenic fluid.

Related Art

Cryogenic fluids have densities that are much higher than gaseous fluids. Consequently, cryogenic pumps (as opposed to gas compressors) afford higher mass flow rates, a smaller footprint, consume less energy and require less maintenance. It is for this reason that cryogenic pumps are used in numerous fields such as units for separating gases from air, reformers, filling stations, maritime sectors.

The fluids in question generally comprise oxygen, nitrogen, natural gas, argon, helium or hydrogen. These compression apparatuses (or pumps) have the function of pressurizing a cryogenic fluid to a target flow rate.

For example, a cryogenic piston pump may be placed directly in line at the outlet of the cryogenic source store or in a dedicated cryogenic bath (also known as a "sump") situated alongside and fed directly by a main storage tank.

For various reasons, in particular the convenience of maintenance and design, the cryogenic pump generally exhibits an alternating movement and is inserted into a tank so as to be submerged in the cryogenic fluid to be pumped.

Cryogenic pumps generally have inlet pressures of between 1 and 20 bar and outlet pressures of 20 to 1000 bar, depending on the application. The pumps may have one or more compression stages using a back-and-forth movement.

The pumps for high pressures and moderate flow rates frequently exhibit an alternating movement with two phases: one phase for the intake (in one direction) and one phase for the delivery (in the other direction). Non-return valves (generally two per compression stage: one for the inlet or intake, one for the outlet or delivery) make it possible to increase the pressure of a fixed quantity of fluid by reducing its volume by relative translational movement between a piston and a sleeve.

The two translational travels have different design requirements as regards the mechanical power and force that are necessary for the movement. The travel for the intake is generally at pressures of between 1 and 20 bar, while the travel for the compression may range up to 1000 bar. These two travels are therefore subjected to very different mechanical and pressure stresses.

The shaft that connects the cold head of the cryogenic pump to the actuating mechanism (motor or the like) is therefore designed in terms of material and cross section for the maximum stress to which it is subjected, that is to say for the most demanding travel (high-pressure compression in the case illustrated here).

For cryogenic applications, the quantity of heat that is conducted through the shaft should be minimized in order to limit the thermal impact on the main compression chamber. Limiting the conduction through the shaft also makes it possible to limit thermal inputs when the pump is stopped or in "stand-by" between the ambient temperature and the cryogenic temperature of the liquefied gas. This reduction in the conduction of the shaft makes it possible to reduce thermal inputs into the bath of liquid whether or not the pump is in operation, and therefore to reduce the evaporation of the liquefied gas.

Thus, the main characteristics of the shafts of cryogenic pumps with an alternating movement are: capacity to transmit a large amount of force and power from the actuating mechanism to the cold head and to minimize the input of heat into the cold head.

It is difficult to comply with these two constraints.

Currently, movement transmission shafts are formed by long metal rods that increase the space requirement in the axial direction, wear and the complexity of guidance.

SUMMARY OF THE INVENTION

An aim of the present invention is to remedy all or some of the drawbacks of the prior art that are set out above.

To this end, the compression apparatus according to the invention, which is otherwise in accordance with the generic definition thereof given in the above preamble, is essentially characterized in that the shaft comprises a portion of reduced cross section in the longitudinal direction, said portion of reduced cross section separating two adjacent parts of the shaft, the shaft also comprising at least one linking element made of material that is less thermally conductive than the constituent material of the shaft, in particular a composite material, said at least one linking element having two ends connected respectively to the two adjacent parts of the shaft.

The invention thus makes it possible to limit thermal inputs through the activation shaft of a cryogenic pump.

Moreover, embodiments of the invention may comprise one or more of the following features:

- in the portion of reduced cross section, the shaft has a cross section reduced by 30 to 85% and preferably reduced by 65 to 80% compared with the cross section of the rest of the shaft,
- the at least one linking element comprises a cable,
- the apparatus comprises a plurality of cables disposed around the portion of locally reduced cross section, the portion of reduced cross section is dimensioned so as to transmit a given compressive load between the two adjacent parts when the shaft is moved in a first direction, and the at least one linking element and possibly also the portion of locally reduced cross section is dimensioned, or are dimensioned, so as to transmit a given tensile load between the two adjacent parts when the shaft is moved in a second direction opposite to the first direction, the compressive load being less than the tensile load, the compressive load is between 1% and 50% and preferably between 2 and 25% of the tensile load, the two adjacent parts of the shaft are separate from one another, the apparatus has a layer of thermally insulating material interposed between the two adjacent parts, the linking element is made from at least one of the following materials: Kevlar, glass fibres, epoxy with carbon fibres, the apparatus is of the single compression stage type and comprises a casing accommodating a single compression chamber, an intake system that communicates with the compression chamber and is configured to allow the inlet of fluid to be compressed into said compression chamber, a movable piston for ensuring the compression of the fluid in the compression chamber, the apparatus also comprising a discharge orifice configured to allow the outlet of compressed fluid from the compression chamber, the apparatus is of the two compression stage type and comprises a first compression chamber, a second compression chamber, an intake system that communicates with the first compression chamber and is configured to allow the inlet of fluid to be compressed into said first compression chamber, a transfer system that communicates with the first and the second compression chamber and is configured to allow the transfer of fluid from the first compression chamber to the second compression chamber, a movable piston for ensuring the compression of the fluid in the first and second compression chambers, the apparatus also comprising a discharge orifice that communicates with the second compression chamber and is configured to allow the outlet of compressed fluid, the second compression chamber being delimited by a portion of the body of the piston and a fixed wall of the apparatus, the intake system being situated at a first end of the apparatus, the discharge orifice being situated at a second end of the apparatus and the transfer system being situated between the intake system and the discharge orifice, the apparatus is housed in a sealed enclosure containing a bath of cryogenic cooling fluid.

The invention also relates to a station for filling tanks of pressurized gas comprising a source of liquefied gas, in particular liquefied hydrogen, a withdrawal circuit having a first end connected to the source of liquefied gas and at least one second end intended to be connected to a tank to be filled, the withdrawal circuit comprising a pumping apparatus or an apparatus for compressing fluid according to any one of the features above or below.

The invention may also relate to any alternative device or method comprising any combination of the features above or below within the scope of the claims.

BRIEF DESCRIPTION OF THE FIGURES

Further particular features and advantages will become apparent from reading the following description, which is given with reference to the figures, in which.

DETAILED DESCRIPTION OF THE INVENTION

The invention may apply to any apparatus for compressing cryogenic fluid having at least one compression stage.

Figure 2:
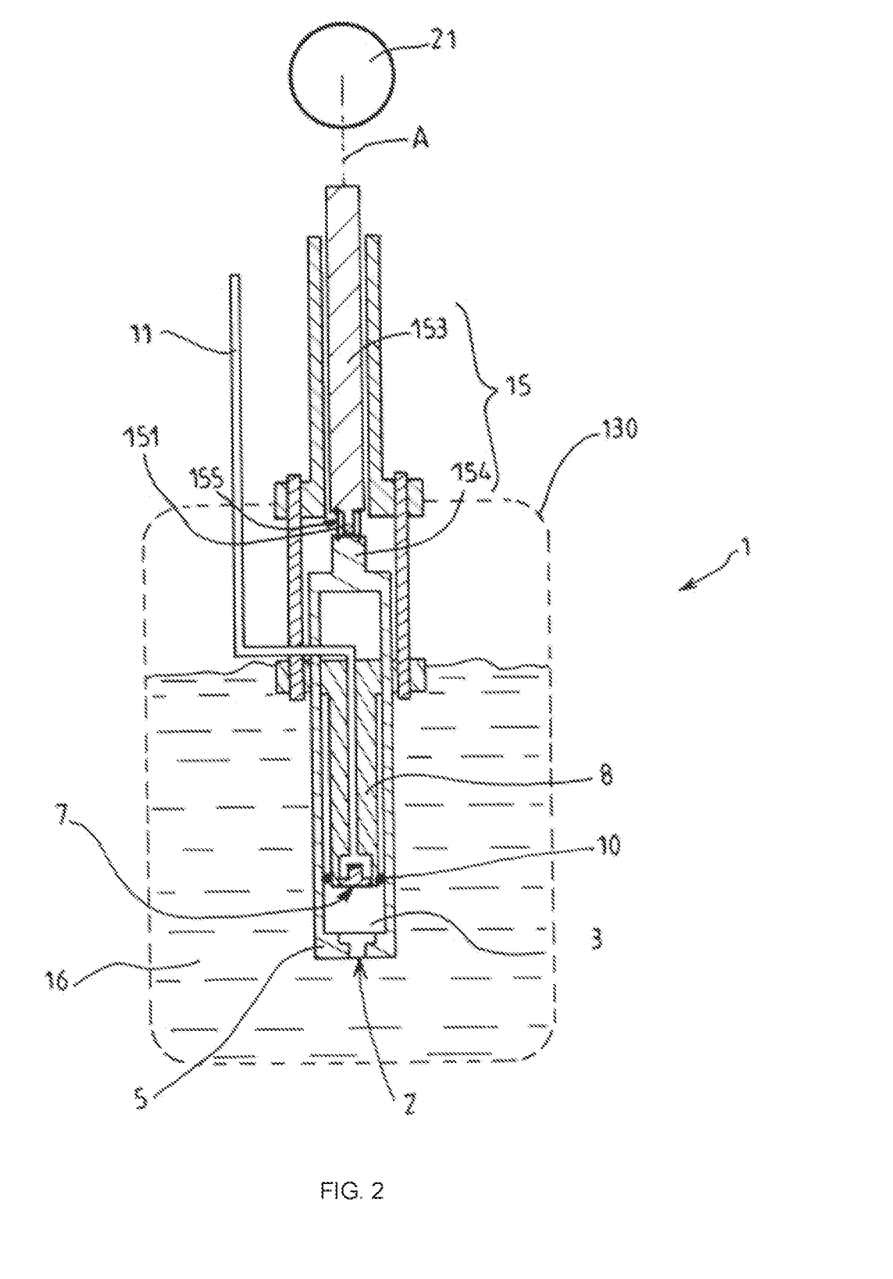
[FIG. 2] shows a schematic and partial view in longitudinal and vertical section illustrating the structure of a first exemplary embodiment of a compression apparatus according to the invention.

In the example in [FIG. 2], the compression apparatus 1 is of the single compression stage type. The apparatus 1 comprises a single compression chamber 3, an intake system 2 that communicates with the compression chamber 3 and is configured to allow the inlet of fluid to be compressed into said compression chamber 3.

The intake system 2 may comprise for example at least one of: one or more non-return valves, one or more orifices or hole(s), at least one flat-disc valve or any other device or valve that allows the inlet of fluid to be compressed into the compression chamber 3 during an intake phase and prevents the outlet of fluid in the compression phase. In particular, this intake system 2 opens in the case of a given pressure difference between its two ends. In addition, the compression chamber 3 may optionally be equipped with a relief valve or some other safety element configured to limit the pressure within the chamber to below a given safety threshold.

The compression chamber 3 is delimited by a portion of the body of the piston 5 and a fixed wall of the apparatus. The piston 5 is able to move in translation in a longitudinal direction A.

The piston 5 may have, at a first end, a tubular portion mounted around a fixed central guide 8.

As illustrated, the compression chamber 3 may be formed in a tubular cavity or fixed chamber in the piston 5, which cavity or chamber is closed at this first end. The compression chamber 3 may thus be delimited in its lower part by a closed tubular lower end of the piston 5. The intake system 2 may be situated at a front end of the piston 5.

The rear end of the piston 5 may be mounted so as to slide with respect to a fixed transverse plate held by longitudinal uprights. The structure of the piston 5 is designed so as, in this case, to allow a part (the rear part) of the piston 5 to slide in said plate (or other support(s)).

For example, the lower portion of the piston 5 is tubular (and forms the compression chamber 3) while the opposite (upper) part of the piston 5 is designed to allow the sliding with respect to the support plate. For example, the upper part of the piston 5 has one or more openings for the passage of the plate or support. The piston 5 can be made in one or more pieces that are joined/secured together.

A first terminal end of the central guide 8 may form the fixed wall delimiting a second end of the compression chamber 3. The rest of the compression chamber 3 is delimited by a sealing system 10 (segments or the like) formed between the central guide 8 and the piston 5.

In other words, the tubular portion of the piston 5 forms an enclosure surrounding the entire compression chamber 3. Thus, the compression chamber 4 may be contained entirely in the tubular portion of the piston 5. Thus, the piston 5 may constitute the casing of the compression chamber 3. This architecture makes it possible to confine the compression chamber 3 in the piston 5, the walls of which may be thermalized (that is to say kept cold) effectively, as described below.

The apparatus 1 also comprises a discharge orifice 7 configured to allow the outlet of compressed fluid from the compression chamber 3.

The discharge orifice 7 may be provided with a non-return system, which may be of the same type as that of the intake system 2 (for example closed as long as the pressure difference between the compression chamber 3 and the outside is below a given threshold).

The piston 5 is secured to a shaft 15, for example a metal shaft, which is able to move in translation along a longitudinal axis A.

The shaft 15 and therefore the piston 5 are able to move with an alternating movement in two opposite directions to ensure phases of compression (in this example with a tensile load on the shaft 15) and intake of fluid (compressive load on the shaft 15) into the chamber 3.

According to an advantageous particular feature, the shaft 15 comprises a portion 151 of locally reduced cross section situated longitudinally between two adjacent parts 153, 154 of the shaft 15 and at least one linking element 155 made of less thermally conductive material having two ends joined respectively to the two adjacent parts 153, 154 of the shaft 15.

The portion 151 of reduced cross section may in particular be dimensioned so as to transmit a given compressive load between two adjacent parts 153, 154 when the shaft 15 is moved in a first direction, while the at least one linking element 155 (and possibly also the portion 151 of locally reduced cross section) is for its part dimensioned (or are dimensioned) so as to transmit a given tensile load between two adjacent parts 153, 154 when the shaft 15 is moved in a second direction opposite to the first direction. The compressive load may be significantly less than the tensile load.

Preferably, the cross section of the shaft 15 is reduced down to a value equal to or greater than the minimum value at which the stress to which the shaft 15 is subjected does not exceed the maximum admissible stress on the material of which it is made.

This makes it possible for the cross section of the shaft 15 to be at least locally undersized in order to reduce the conduction of heat in the axial direction. Specifically, this reduced cross section and the structure of the linking element 155 make it possible to reduce the conduction of heat between the relatively cold and hot parts of the apparatus 1.

The mechanical characteristics of the shaft 15 are not impaired by this reduction in the cross section by virtue of the linking element(s) 155, which at least partially take up the greater tensile loads during the compression phase (tension on the shaft).

The for example composite structure of the linking element(s) 155 also promotes the lower transmission of heat along the shaft 15. For example, the at least one linking element 155 may be made from at least one of the following materials: Kevlar, glass fibres, epoxy with carbon fibres, or any other material suited to withstanding tensile loads and having thermal conductivity lower than that of the metal or alloy conventionally used to make the shaft.

The upper and lower parts of the shaft 15 may thus be connected by cables 155, wires, composite braids and be simply in contact through the joining of the cables 155 and their metal parts. This creates additional thermal insulation.

These materials have the advantage of having a much greater strength at break and lower thermal conductivity than metals. These composite materials have very high tensile strength and lower compressive strength. However, depending on the arrangement of the invention, these linking elements are loaded essentially or exclusively during tension. In the compressive loading phase of the shaft, it is the portion 151 of locally reduced cross section that takes up all or the majority of the loads or stresses. This is because the structure of rods or cables 155 does not allow the latter to be subjected to compressive loading (for example via slack or relative flexibility of the cables 155). Furthermore, it is conceivable (although this embodiment is not preferred) that, under tension, the two adjacent parts 153, 154 of the shaft 15 move away from one another during the tension and butt against one another during the compression.

For example, during the compressive movement of the shaft (for example upward when the apparatus is oriented vertically), the shaft 15 is pulled upward by the upper part 153 connected to a motor 21. The linking elements 155 are pulled under tension and thus transfer the force to the lower part 154. During the downward travel, when only a fraction of the upward force is necessary, the upper part 153 moves down and pushes the lower part 154. The smaller contact surface is sufficient for transferring the compressive load downward.

In the portion 151 of reduced cross section, the shaft 15 may have a cross section reduced by 30 to 85% and preferably reduced by 65 to 80% compared with the cross section of the rest of the shaft 15. In other words, compared with the usual dimensions of the shaft 15 in prior art embodiments, the invention allows a local reduction in the significant dimensions, this reducing the thermal conduction but not jeopardizing the requirements of mechanical integrity for the passage of the loads, in particular tensile loads.

The portion 151 of reduced cross section may be formed along a small length, for example up to 5% of the length of the shaft 15.

For example, this reduction in cross section is suited to a load during intake which may be between 1% and 50% and preferably between 2 and 25% of the tensile load.

The at least one linking element 155 may comprise a plurality of cables 155 or rods having two ends that are secured respectively to the two adjacent parts 153, 154 of the shaft 15 (for example the upper and lower part, respectively).

Figure 5:
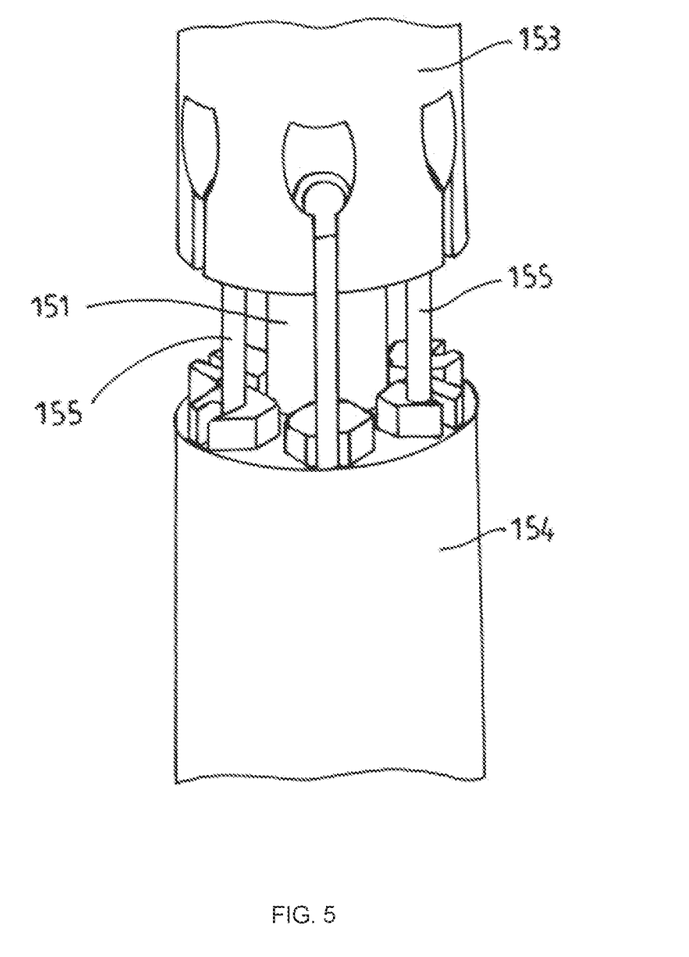
[FIG. 5] shows a perspective view of the detail in [FIG. 4].

As illustrated, the cables 155 may be distributed around the portion 151 of locally reduced cross section.

The two adjacent parts 153, 154 of the shaft 15 that are situated on either side of the portion 151 of reduced cross section may be in one piece or be separate pieces (of the same composition or of different compositions).

Figure 4:
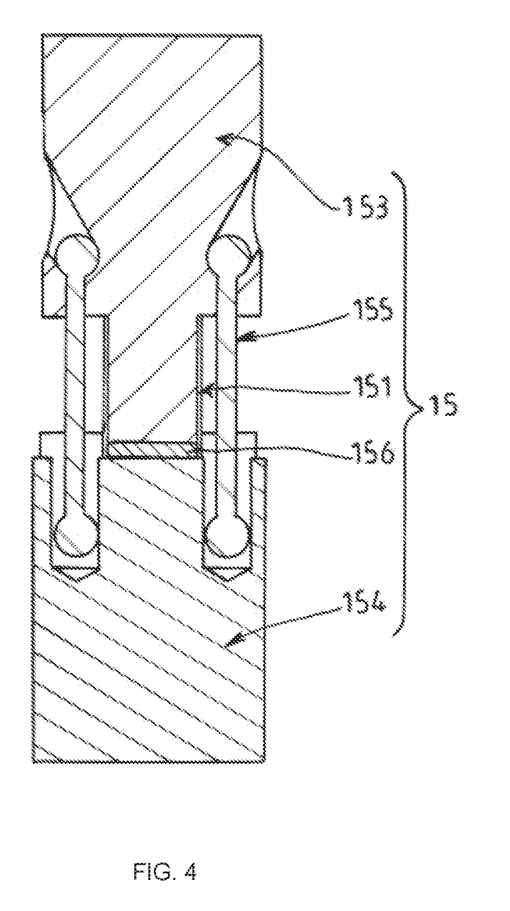
[FIG. 4] shows a schematic and partial view in longitudinal and vertical section illustrating a detail of an example of the structure of a shaft of a compression apparatus according to the invention.

As illustrated in [FIG. 4], at least one layer 156 of thermally insulating material may be interposed between the two adjacent parts 153, 154, for example at the portion 151 of locally reduced cross section. This layer may comprise for example: glass fibre, hard or chrome steel, polymers of the PTFE type, etc.

Figure 3:
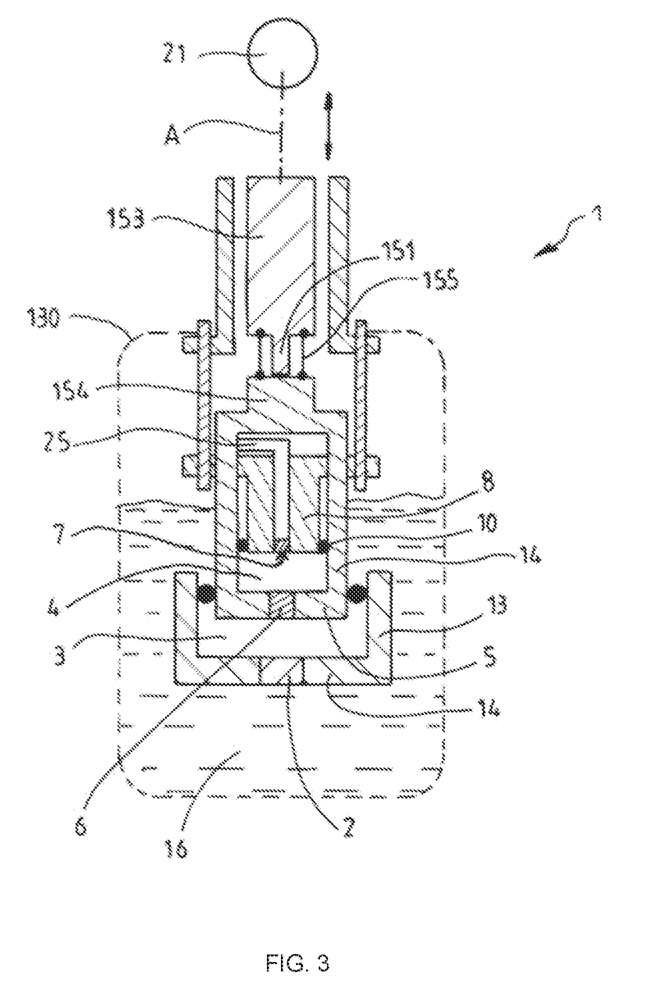
[FIG. 3] shows a schematic and partial view in longitudinal and vertical section illustrating the structure of a second exemplary embodiment of a compression apparatus according to the invention.

As illustrated in [FIG. 3], this particular feature may also apply to a compression apparatus having two compression stages.

This non-limiting example of a compression apparatus 1 comprises a first compression chamber 3, a second compression chamber 4, an intake system 2 that communicates with the first compression chamber 3 and is configured to allow the inlet of fluid to be compressed into said first compression chamber 3 (cf. above for the possible realizations of this intake system 2). The apparatus 1 also comprises a transfer system 6 that communicates with the first 3 and the second 4 compression chamber and is configured to allow the transfer of fluid from the first compression chamber 3 to the second compression chamber 4 (the transfer system 6 may be of the same type as that of the intake system discussed above).

The apparatus also comprises a movable piston 5 for ensuring the compression of the fluid in the first 3 and second 4 compression chambers. The apparatus 1 also comprises a discharge orifice 7 that communicates with the second compression chamber 4 and is configured to allow the outlet of compressed fluid. This discharge system may have a valve system of the same type as that described above.

As illustrated, the second compression chamber 4 may be delimited by a portion of the body of the piston 5 and a fixed wall of the apparatus. In addition, the piston 5 may have a tubular portion mounted around a fixed central guide 8. A terminal end of the central guide 8 may form the fixed wall delimiting a part of the second compression chamber 4. The apparatus 1 comprises a sealing system 10 formed between the central guide 8 and the piston 5. The intake system 2 is situated at a first end of the apparatus 1, the discharge orifice 7 being situated at an opposite second end of the apparatus, and the transfer system 6 is situated preferably between the intake system 2 and the discharge orifice 7.

More generally, the invention may apply to any compression apparatus comprising a shaft 15 driven by a drive member 21 and connected to a (piston/sleeve) mechanism for compressing a fluid, in particular a cryogenic fluid.

As illustrated, the compression system, and preferably the compression apparatus 1, may be housed in a thermally insulated sealed enclosure 13 containing a bath 16 of cryogenic cooling fluid.

In particular, the compression chamber(s) 3, 4 may be submerged in a liquid phase. The upper part of the enclosure 16 may have a gas headspace which collects any leaks in the apparatus 1.

Thus, the cold head of the apparatus 1 may be submerged vertically in a cryogenic bath (sometimes referred to as "sump").

In the case of two compression stages, the first compression stage collects the fluid at low pressure and then moves it by compression towards the second compression stage along the longitudinal axis A. The high-pressure fluid then leaves the second compression stage upwardly (when the axis A is not horizontal).

Thus, the invention makes it possible to use a metal rod or shaft 15 having an improved thermal barrier. A composite or equivalent material is used preferably under tension during the travel at high pressure but the metal section is used under compression.

The cross section of the shaft may be dimensioned for the transmission of force/power necessary during the intake travel, which is therefore much lower than if it were dimensioned for the loads of the fluid compression travel.

This makes it possible to reduce the length of the shaft 15 compared with the prior art while improving the thermal performance when the shaft 15 is subjected to a large thermal gradient.

A compression apparatus 1 of this type (or a plurality in series or in parallel) may be used in any cryogenic installation that requires the pumping or compressing of a cryogenic fluid.

Figure 1:
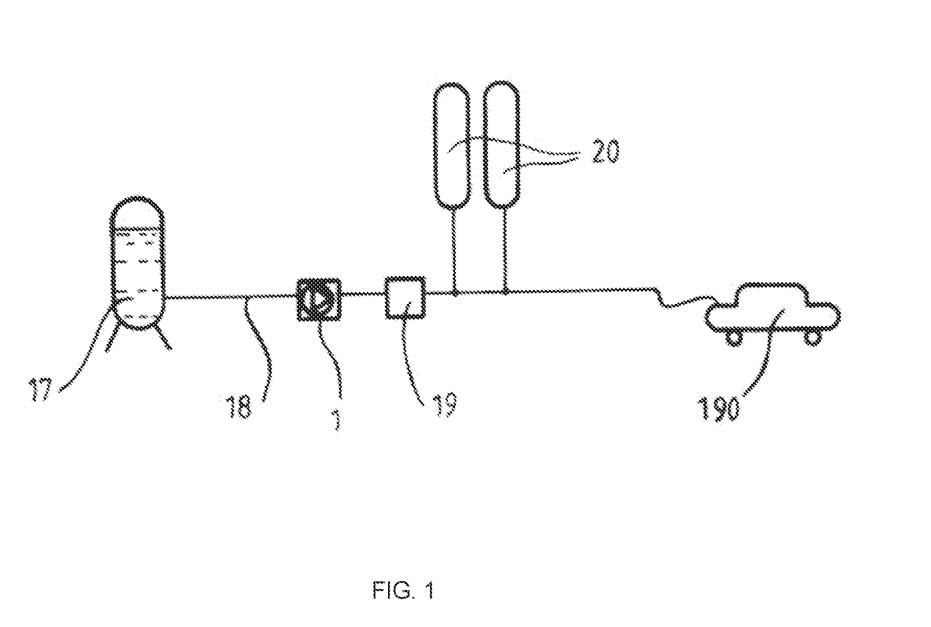
[FIG. 1] shows a schematic and partial view illustrating an example of a filling station that can use a compression apparatus.

For example, a station for filling tanks of pressurized gas (hydrogen for example) may comprise a source 17 of liquefied gas, a withdrawal circuit 18 having a first end connected to the source and at least one second end intended to be connected to a tank 190 to be filled, the withdrawal circuit 18 comprising such a pumping apparatus 1. The fluid pumped may be vaporized in a downstream exchanger 19 and optionally stored in one or more pressurized buffer tanks 20.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. An apparatus for compressing cryogenic fluid in at least one compression stage comprising: at least one piston and at least one sleeve delimiting at least one compression chamber; a shaft that is able to move in translation along a longitudinal axis (A) . . . the shaft also comprising at least one linking element made of material that is less thermally conductive than a constituent material of the shaft,... characterized in that, in the portion of reduced cross section, the reduced cross section is reduced by 30 to 85% compared with a cross section of the rest of the shaft, wherein the at least one linking element comprises at least one cable.

2. The apparatus of claim 1, wherein the at least one cable comprises a plurality of cables disposed around the portion of locally reduced cross section.

3. The apparatus of claim 1, wherein the portion of reduced cross section is dimensioned so as to transmit a given compressive load between the two adjacent parts when the shaft is moved in a first direction, and in that the at least one linking element and possibly also the portion of locally reduced cross section is dimensioned, or are dimensioned, so as to transmit a given tensile load between the two adjacent parts when the shaft is moved in a second direction opposite to the first direction, the compressive load being less than the tensile load.

4. The apparatus of claim 3, wherein the compressive load is between 1% and 50% and preferably between 2 and 25% of the tensile load.

5. The apparatus of claim 1, wherein the two adjacent parts of the shaft are separate from one another.

6. The apparatus of claim 5, wherein a layer of thermally insulating material is interposed between the two adjacent parts.

7. The apparatus of claim 1, wherein the linking element is made from at least one of the following materials: Kevlar, glass fibres, epoxy with carbon fibres.

8. The apparatus of claim 1, wherein the apparatus is of the single compression stage type and the apparatus further comprises a casing accommodating a single compression chamber, an intake system that communicates with the compression chamber and that is configured to allow inlet of fluid, to be compressed, into said compression chamber, a movable piston for ensuring the compression of the fluid in the compression chamber, and a discharge orifice configured to allow outlet of compressed fluid from the compression chamber.

9. The apparatus of claim 1, wherein the apparatus is of the two compression stage type and the apparatus further comprises a first compression chamber, a second compression chamber, an intake system that communicates with the first compression chamber and that is configured to allow inlet of fluid to be compressed into said first compression chamber, a transfer system that communicates with the first and the second compression chamber and that is configured to allow the transfer of fluid from the first compression chamber to the second compression chamber, a movable piston for ensuring the compression of the fluid in the first and second compression chambers, and a discharge orifice that communicates with the second compression chamber and that is configured to allow the outlet of compressed fluid, the second compression chamber being delimited by a portion of the body of the piston and a fixed wall of the apparatus, the intake system being situated at a first end of the apparatus, the discharge orifice being situated at a second end of the apparatus and the transfer system being situated between the intake system and the discharge orifice.

10. The apparatus of claim 1, wherein the apparatus is housed in a sealed enclosure containing a bath of cryogenic cooling fluid.

11. The apparatus of claim 1, wherein in the portion of reduced cross section, the shaft has a cross section reduced by 65 to 80% compared with the cross section of the rest of the shaft.

12. A station for filling tanks with pressurized gas, comprising: a source of liquefied gas and a withdrawal circuit that has a first end connected to the source of liquefied gas and at least one second end intended to be connected to a tank to be filled, the withdrawal circuit comprising the apparatus of claim 1.

13. The station of claim 12, wherein the liquefied gas is liquefied hydrogen.

14. A method for filling tanks with pressurized hydrogen, comprising the steps of:
 providing a station for filling tanks with pressurized hydrogen, comprising a source of liquefied gas and a withdrawal circuit that has a first end connected to the source and at least one second end connected to a tank to be filled, the apparatus having disposed therein the apparatus of claim 1, an exchanger, and one or more pressurized buffer tanks, the liquefied gas being liquid hydrogen;
 pumping liquid hydrogen from the source towards the tank using the apparatus;
 vaporizing the pumped liquid hydrogen in the exchanger to provide pressurized vaporized hydrogen;
 optionally storing the pressurized vaporized hydrogen in the one or more pressurized buffer tanks; and
 filling the tank with the pressurized vaporized hydrogen.

\* \* \* \* \*